United States Patent [19]

Case

[11] 4,392,308
[45] Jul. 12, 1983

[54] LEVEL ROD FOR GRADING

[76] Inventor: Theodore W. Case, 778 Center St., Wallingford, Conn. 06492

[21] Appl. No.: 951,600

[22] Filed: Oct. 16, 1978

[51] Int. Cl.³ .......................................... G01C 15/06
[52] U.S. Cl. ................................................ 33/293
[58] Field of Search ................................. 33/293–295

[56] References Cited

U.S. PATENT DOCUMENTS

| | | | |
|---|---|---|---|
| 624,362 | 5/1899 | Millikin et al. | 33/294 |
| 905,441 | 12/1908 | Lenker | 33/294 |
| 905,442 | 12/1908 | Lenker | 33/294 |
| 985,784 | 3/1911 | Dailey | 33/294 |
| 1,295,749 | 2/1919 | Hiatt | 33/294 |
| 1,428,669 | 9/1922 | Watson | 33/295 |
| 1,445,526 | 2/1923 | McMorris | 33/294 |
| 2,218,418 | 10/1940 | Cain et al. | 33/295 |
| 2,909,839 | 10/1959 | Miller | 33/294 |
| 3,110,109 | 11/1963 | Brittenham | 33/293 |

FOREIGN PATENT DOCUMENTS 865532 7/1949 Fed. Rep. of Germany ........ 33/294

Primary Examiner—Charles E. Phillips
Attorney, Agent, or Firm—St. Onge, Steward, Johnston & Reens

[57] ABSTRACT

A device for use in grading operations and includes an elongated rod having front, rear and side surfaces. The endless band is formed by a first band portion of a given color and having a first set of graduations extending from zero at one end thereof to a first value at the other end thereof and a second band portion of a color clearly distinguishable from the given color and having a second set of graduations ascending from zero at one end thereof to a second value at the opposite end thereof. Attached to the one end of the first band portion is the one end of the second band portion while the opposite end of the first band portion is attached to the opposite end of the second band portion. A slide mechanism is mounted for longitudinal sliding movement on the elongated rod and includes a clamp for selectively securing the slide mechanism to the endless belt.

10 Claims, 4 Drawing Figures

LEVEL ROD FOR GRADING

BACKGROUND OF THE INVENTION

This invention relates generally to a device for use in establishing desired grade levels on construction sites and, more particularly, to such a device that provides for machine operators a visible indication of the cut or fill that is required to establish the desired grade.

In many types of construction projects it is necessary to modify existing terrain while establishing new grade levels that are required for a specific purpose. Such grading operations can include either filling which entails the addition of material to the existing terrain so as to establish a higher grade level or cutting which entails the removal of material to establish a lower grade level. On most construction sites, grading is accomplished with earth moving equipment such as bulldozers. Typically, surveying equipment is utilized to establish indications of desired grade elevations on grade stakes located remotely from the surface being worked. Such grade stakes indicate the amount of cut or fill that is required relative to a given elevation marked on the stake. A grade foreman located in the area being worked utilizes a ruler and a hand level in conjunction with the grade stakes to determine the amount of fill or cut required in specific locations. In arriving at such a determination, the grade foreman must compare the reading obtained with his ruler to the required grade information indicated on the grade stake and calculate the actual amount of fill or cut that is required. Having established the type and degree of grading operation required, the grade foreman must transmit this information to the operator of a machine being used to reestablish desired grade levels. Typically, the transmission of grading information from the grade foreman to the machine operator is accomplished with various types of hand signals. Because of errors made either in the original grading calculations made by the grade foreman or in the transmission of correct information to a machine operator, certain passes by a machine operator often produce inaccurate cuts or fills. In addition, the requirements for both calculating and conveying desired grade change information often induces substantial delays between passes by an earth moving machine and thereby reduces the efficiency of a grading operation.

The object of this invention, therefore, is to provide a device that will obviate some of the problems associated with conveying grade level information to machine operators and thereby improve the efficiency of grading operations.

SUMMARY OF THE INVENTION

The invention is a device for use in grading operations and includes an endless band mounted for circumvolutionary movement around an elongated rod having front, rear and side surfaces. The endless band is formed by a first band portion of a given color and having a first set of graduations extending from zero at one end thereof to a first value at the other end thereof and a second band portion of a color clearly distinguishable from the given color and having a second set of graduations ascending from zero at one end thereof to a second value at the opposite end thereof. Attached to the one end of the first band portion is the one end of the second band portion while the opposite end of the first band portion is attached to the opposite end of the second band portion. A slide mechanism is mounted for longitudinal sliding movement on the elongated rod and includes a clamp for selectively securing the slide mechanism to the endless belt. By using a hand level and the grade level information appearing on a grade stake to suitably position the endless band on the elongated rod, a given length portion of either the first or second band appearing at the bottom of the elongated rod indicates the amount of grading required and the color of that particular band portion indicates whether the requirement is for cutting or filling. Thus, without any requirement for intermediate calculations, the present device can be used to convey the required grading information directly to a machine operator.

In a preferred embodiment of the invention, the slide mechanism includes an alignment channel having a pair of oppositely inclined sides that intersect along a line adjacent to one of the elongated rod's side surfaces and perpendicular to its front and rear surfaces. The sides of the alignment channel are equally inclined to the vertical so as to form equal angles with the elongated rod. The alignment channel accommodates and properly orients a hand level when used to position the endless band with respect to a level mark on a remote grade stake.

According to one feature of the invention, the slide mechanism includes an indicator edge extending along the front surface of the elongated rod and arranged for selective alignment with the graduations on the endless band. The indicator edge is perpendicular to the intersection between the sides forming the alignment channel thereby insuring that the specific graduation on the endless band indicated by the indicator edge will be in alignment with the hand level utilized to sight a remote stake.

DESCRIPTION OF THE DRAWINGS

These and other objects and features of the present invention will become more apparent upon a perusal of the following specification taken in conjunction with the accompanying drawings wherein.

DESCRIPTION OF THE PREFERRED EMBODIMENT

Figure 1:
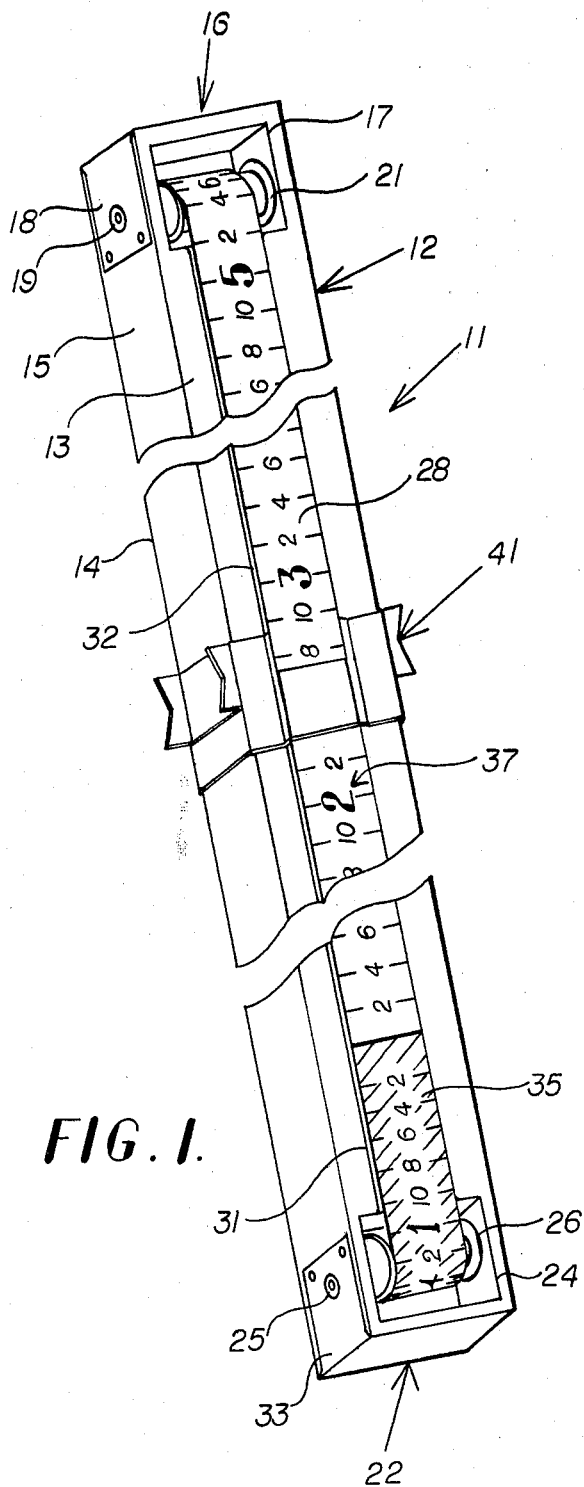
FIG. 1 is a schematic perspective view of the invention.

Referring now to FIG. 1 there is shown a device 11 for use in grading operations. The device 11 includes an elongated rod 12 having a front surface 13, a rear surface 14 and side surfaces 15. Mounted to the upper end of the rod 12 is a cap bracket 16 having spaced apart legs 17 and 18. Extending between the legs 17 and 18 is a bolt assembly 19 that supports a rotatable pulley 21. Similarly mounted on the bottom end of the elongated rod 12 is a foot bracket 22 having spaced apart legs 23 and 24. Extending between the legs 23 and 24 is a bolt assembly 25 that supports a rotatable pulley 26.

Figure 2:
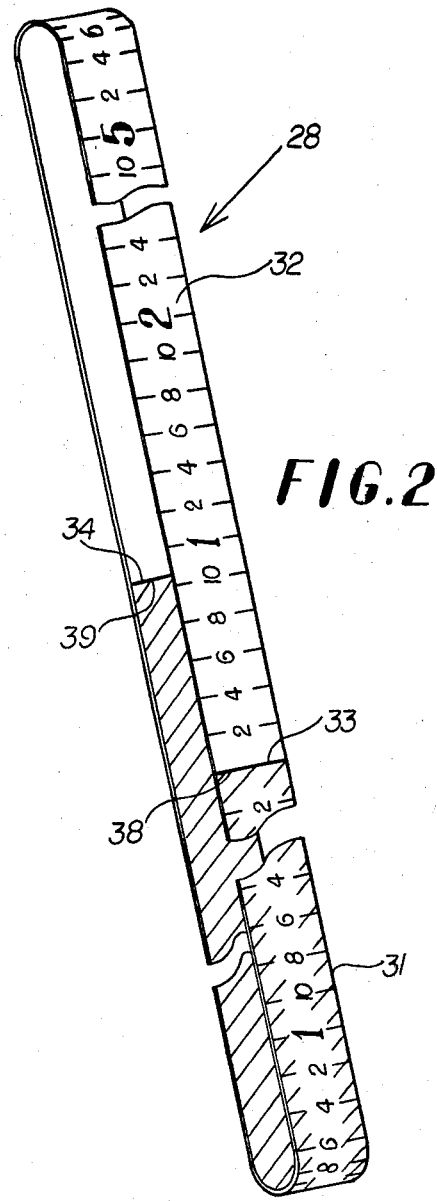
FIG. 2 is a schematic perspective view of an endless band shown in FIG. 1.

An endless belt 28 extends longitudinally around the elongated rod 12 and over the pulleys 21 and 26. The pulleys 21 and 26 accommodate circumvolutionary movement of the endless belt band 28 around the elongated rod 12. As shown most clearly in FIG. 2, the endless band 28 includes a first band portion 31 of a given color, for example red, and a second band portion 32 of a color, for example white, clearly distinguishable from the given color. Appearing on the first band portion 31 is a first set of length-indicating graduations 35 ascending from zero at one end 33 thereof to a given value, for example five feet, at an opposite end 34 thereof. Similarly appearing on the second band portion 32 is a second set of graduations 37 having the same scale as the first set of graduations 35 and ascending from zero at one end 38 thereof to a second value, for example five feet, at an opposite end 39. The one end 33 of the first band 31 is attached to the one end 38 of the second band 32 and the opposite end 34 of the first band 31 is attached to the opposite end 39 of the second band 32 so as to form the endless band 28.

Figure 3:
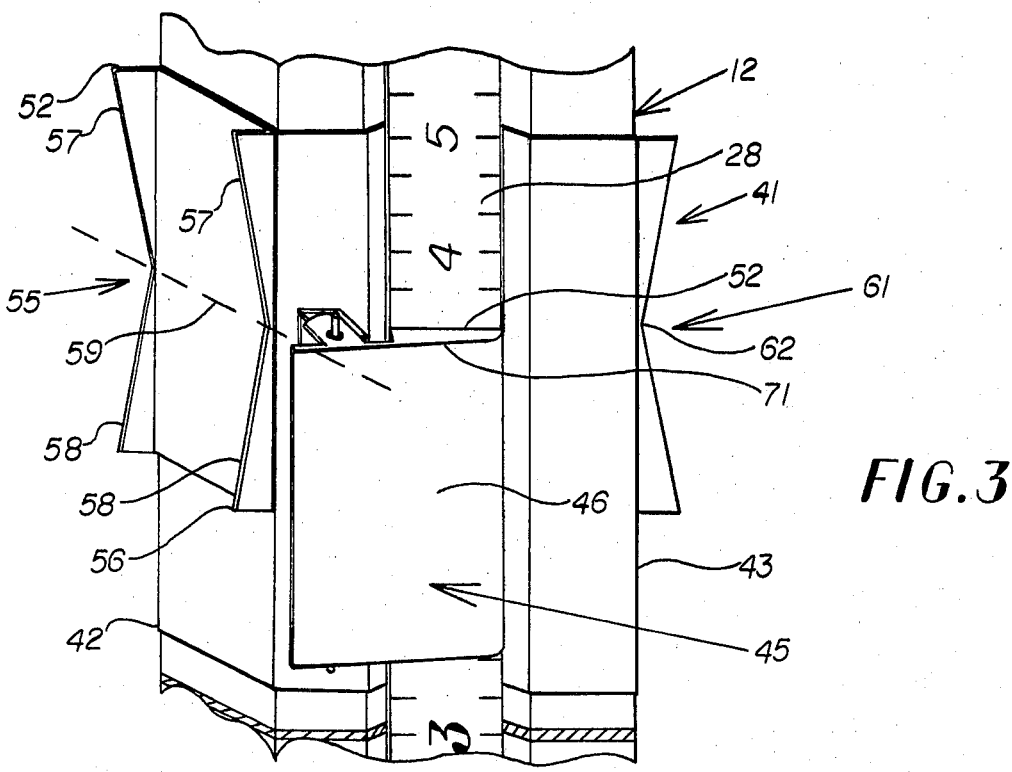
FIG. 3 is a detailed view of a slide mechanism shown in FIG. 1.
Figure 4:
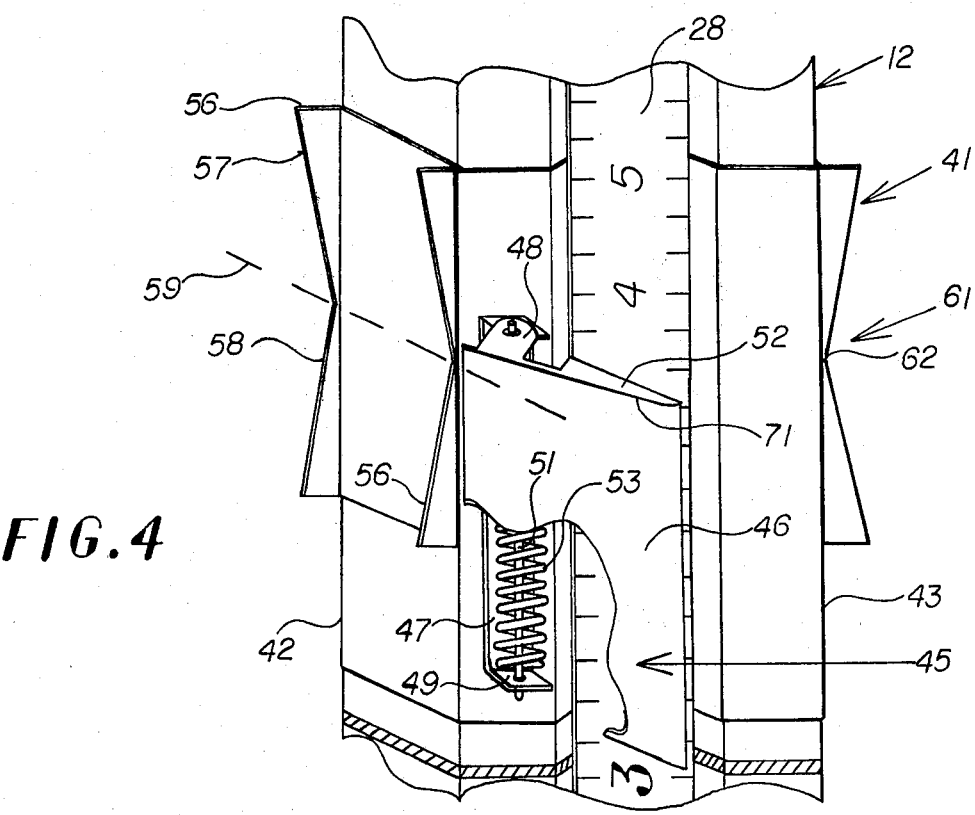
FIG. 4 is a schematic view of the slide mechanism of FIG. 2 shown in a released position.

Referring now to FIG. 3, there is shown a slide mechanism 41 that moves longitudinally on the elongated rod 12. The slide mechanism 41 includes a pair of spaced apart channel sections 42 and 43 joined by a web section 44. The channels 42 and 43, respectively, extend around the side surfaces 15 of the elongated rod 12 while the web section 44 is overlaid by the endless belt 28. Mounted on the slide mechanism 41 is a clamp mechanism 45 including a clamp plate 46 that is pivotally mounted on a bracket 47 fixed to the channel 42. The plate 46 possesses a pair of ears 48 that together with ears 49 on the opposite ends of the bracket 47 accommodate a bolt assembly 51. Mounted on the inner surface of the plate 46 is a pad 52 that engages the endless band 28. A torsion spring member 53 is positioned on the bolt 51 and provides a bias that causes the pad 52 to engage and force the endless belt 28 against the web section 44 of the slide mechanism 41. When so engaged, the clamp mechanism 45 prevents relative movement between the endless belt 28 and the slide mechanism 41. However as shown in FIG. 4, the plate 46 can be pivoted out of engagement with the web section 44 so as to permit relative movement between the endless belt 28 and the slide mechanism 41.

Mounted on the side surface of the channel 42 is an open channel 55 formed by a pair of spaced apart brackets 56 located on opposite edges of the channel 42. Each of the brackets 56 includes oppositely inclined sides 57 and 58 that intersect along an alignment line 59 that is perpendicular to the front and rear surfaces 13 and 14 of the elongated rod 12. The upper and lower halves of the brackets 56 are identical so that the inclined side edges 57 and 58 make equal angles with the elongated rod 12. Similarly mounted on the side surface of the channel 43 is an open channel 61 that is identical to the channel 55. The channel 61 also has inclined sides that intersect along a line 62 parallel to the line 59.

During use, a rod man would position the device 11 vertically with the foot 22 resting on the ground in a location wherein a desired grade is to be established. The rod man would then transfer the elevation data from an appropriate grade stake to the device 11. The transfer is accomplished by manually releasing the clamp plate 46 from the web section 44 as shown in FIG. 4 so as to permit movement of the slide mechanism 41 relative to the endless band 28. The slide 41 is moved to produce alignment of an upper indicator edge 71 of the clamp plate 46 with the specific graduation on the band portion 37 corresponding to the elevation data appearing on the grade stake. After such alignment of the slide mechanism 41, the clamp plate 46 is released allowing the spring member 53 to force the clamp pad 52 against the web section 44. This action secures the slide mechanism 41 to the endless band 28 which is forcibly retained between the pad 52 and the web section 44. Next, a hand level (not shown) is positioned in the open channel 55 and used to bring the slide mechanism 41 into horizontal alignment with the grade mark on the remote grade stake. Obviously, if desired, the other open channel 61 could also be used to accommodate a hand level. It will be appreciated that the oppositely and symmetrically inclined sides 56 and 57 of the channel 55 will guide the hand level 72 into a position axially aligned with the alignment line 59. Furthermore, since the alignment line 59 is perpendicular to the indicator edge 71 of the clamp plate 46, the arrangement of the slide mechanism 51 insures that the reading on the endless band 28 indicated by the indicator edge 71 is in horizontal alignment with the grade mark on the grade stake being used.

With the indicator edge 71 horizontally aligned with a grade mark on a grade stake and with the graduation on the endless band 28 corresponding to the amount of cut or fill required with respect to that grade mark, it will be apparent that the grade desired is represented by the zero mark on the endless band 28. Thus, the distance between the zero mark on the endless band and the bottom of the rod 12 represents the amount of cut or fill that is required in the location being checked. Furthermore, whether a cut or a fill is required is indicated by which of the band portions 31 or 37 of the endless band 28 appears between the zero mark 33 and the bottom of the rod 12. For example, if a cut is required the zero point 38 on the second band portion 37 would have passed under the rod 12 during the alignment process and reached a position on the rear surface 14 thereof. Thus, the appearance of a portion of the second band 37 between the bottom of the rod 12 and the zero mark 38 indicates that a cut is required in an amount corresponding to the length of that band portion. Conversely, if a fill is required, the zero end 38 of the second band portion 37 will not have reached the bottom of the rod 12 during alignment of the slide mechanism 41. Thus, a portion of the first band 31 will lie between the zero mark 38 and the bottom of the rod 12 indicating that a fill is required in an amount corresponding to the length of that band portion. The rod man easily conveys the information retained on the rod 12 to a machine operator by merely facing the zero mark on the endless band 28 toward the machine operator. As noted above, if a cut is required the zero will appear on the rear surface 14 of the rod 12 while if a fill is required the zero will appear on the front surface 13 thereof. Observation of which band portion 31 or 37 lies at the bottom of the rod 12 indicates to the machine operator whether a cut or a fill is required and the length of that exposed band portion corresponds to the amount of cut or fill necessary. Furthermore, because of the clearly distinguishable colors employed for the different band portions 31 and 37, the grading requirements can be easily determined by a machine operator located a substantial distance from the rod 12.

Obviously, many modifications and variations of the present invention are possible in light of the above teachings. It is to be understood, therefore, that the invention can be practiced otherwise than as specifically described.

What is claimed is:

1. A device for use in grading operations for determining and visually indicating the depth of cut or fill required to establish a desired grade level in one place relative to grade level indicating means positioned in another place, the device comprising:

an elongated rod having front, rear and side surfaces;

an endless band extending longitudinally around said elongated rod along said front and rear surfaces, said endless band comprising a first band portion of a given color and having a first set of graduations ascending from zero at one end thereof to a first value at the other end thereof and a second band portion of a color clearly distinguishable from said given color and having a second set of graduations ascending from zero at one end thereof to a second value at the opposite end thereof, said one end of said first band portion being attached to said one end of said second band portion and said opposite end of said first band portion being attached to said opposite end of said second band portion;

mounting means supporting said endless band on said elongated rod and accommodating circumvolutionary movement therearound; and a slide mechanism mounted for longitudinal sliding movement on said elongated rod, said slide mechanism comprising clamp means for selectively and alternatively either securing said slide mechanism to said endless band so as to prevent relative movement therebetween or releasing said slide mechanism from said endless band so as to allow relative movement therebetween, said slide mechanism while secured to said band being slidable longitudinally to establish generally horizontal alignment between said slide mechanism and said indicating means to visually indicate a length on said endless band between said zero and one of said graduations, said length corresponding to the depth of the required cut or fill.

2. A device according to claim 1 wherein said slide mechanism further comprises alignment means for establishing the orientation of a hand level.

3. A device according to claim 2 wherein said alignment means defines an open channel with a pair of oppositely inclined sides that intersect along a guide line adjacent to one of said side surfaces and perpendicular to said front and rear surfaces of said elongated rod, said sides forming substantially equal angles with said elongated rod.

4. A device according to claim 3 wherein said alignment means comprises a pair of spaced apart brackets having each oppositely inclined edges that define said sides, said brackets being spaced apart along said one side surface of said elongated rod.

5. A device according to claim 3 wherein said alignment means further defines a second open channel with a second pair of oppositely inclined sides that intersect along a second line adjacent to a side surface of said elongated rod opposite said one side surface thereof and longitudinally aligned with said guide line on said elongated rod, said second sides forming substantially equal angles with said elongated rod.

6. A device according to claim 5 wherein said alignment means comprises a first pair of brackets spaced apart along said one side surface of said elongated rod and each having oppositely inclined edges that define said sides, and a second pair of brackets spaced apart along said opposite side surface of said elongated rod and each having oppositely inclined edges that define said second sides.

7. A device according to claim 5 wherein said alignment means comprises a first pair of brackets spaced apart along said one side surface of said elongated rod and each having oppositely inclined edges that define said sides, and a second pair of brackets spaced apart along said opposite side surface of said elongated rod and each having oppositely inclined edges that define said second sides.

8. A device according to claim 3 wherein said slide mechanism comprises an indicator edge extending along said front surface of said elongated rod and arranged for selective alignment with said graduations, said indicator edge being perpendicular to said guide line.

9. A device according to claim 8 wherein said alignment means comprises a pair of spaced apart brackets having each oppositely inclined edges that define said sides, said brackets being spaced apart along said one side surface of said elongated rod.

10. A device according to claim 8 wherein said alignment means further defines a second open channel with a second pair of oppositely inclined sides that intersect along a second line adjacent to a side surface of said elongated rod opposite said one side surface thereof and longitudinally aligned with said guide line on said elongated rod, said second sides forming substantially equal angles with said elongated rod.

* * * * *